Nov. 22, 1966  N. A. VIRTA  3,287,199
JAW ASSEMBLY FOR CONTAINER FORMING AND FILLING MACHINE
Filed Oct. 24, 1963  2 Sheets-Sheet 1
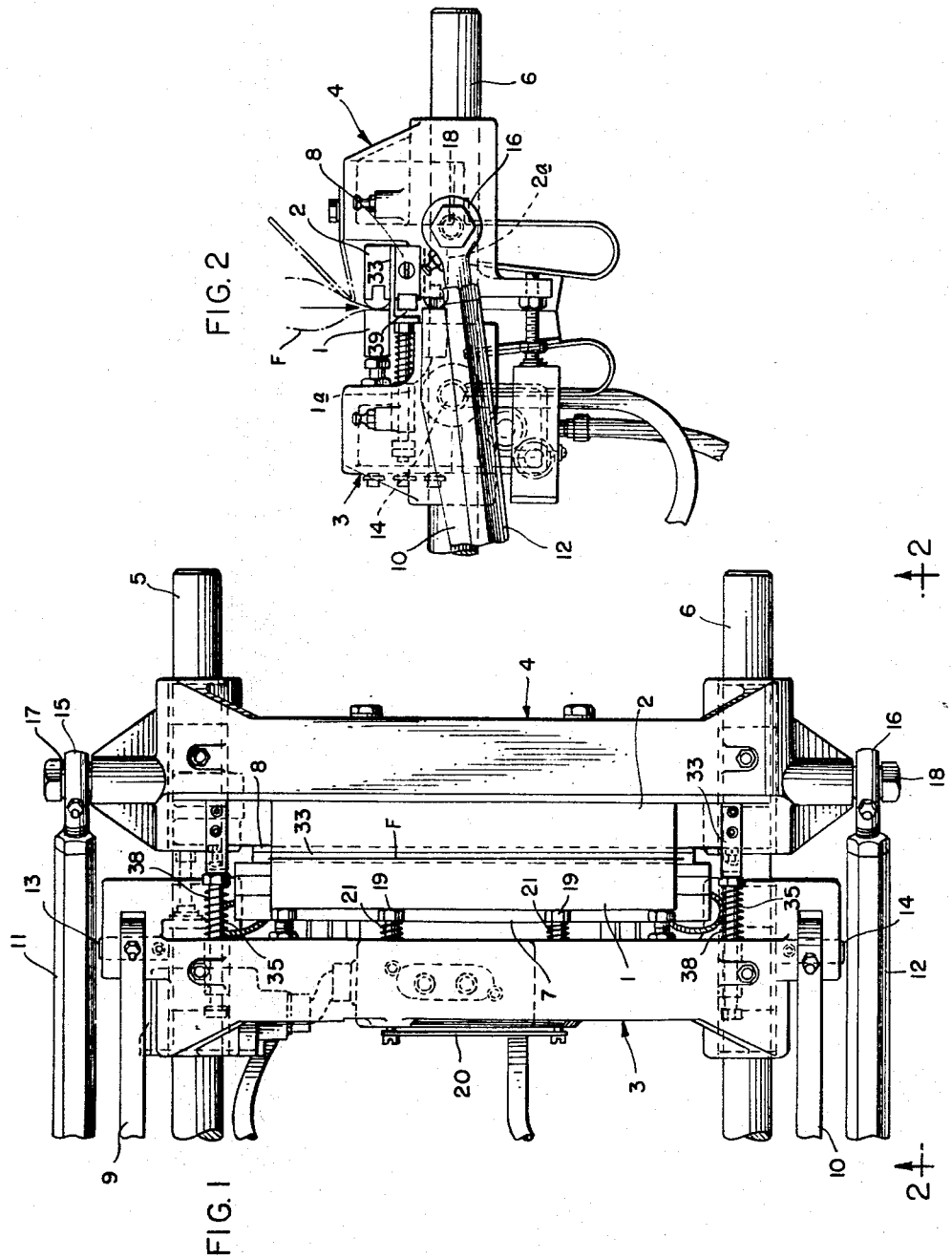
INVENTOR:
NORMAN A. VIRTA
BY
Marzall, Johnston, Cook & Root
ATT'YS

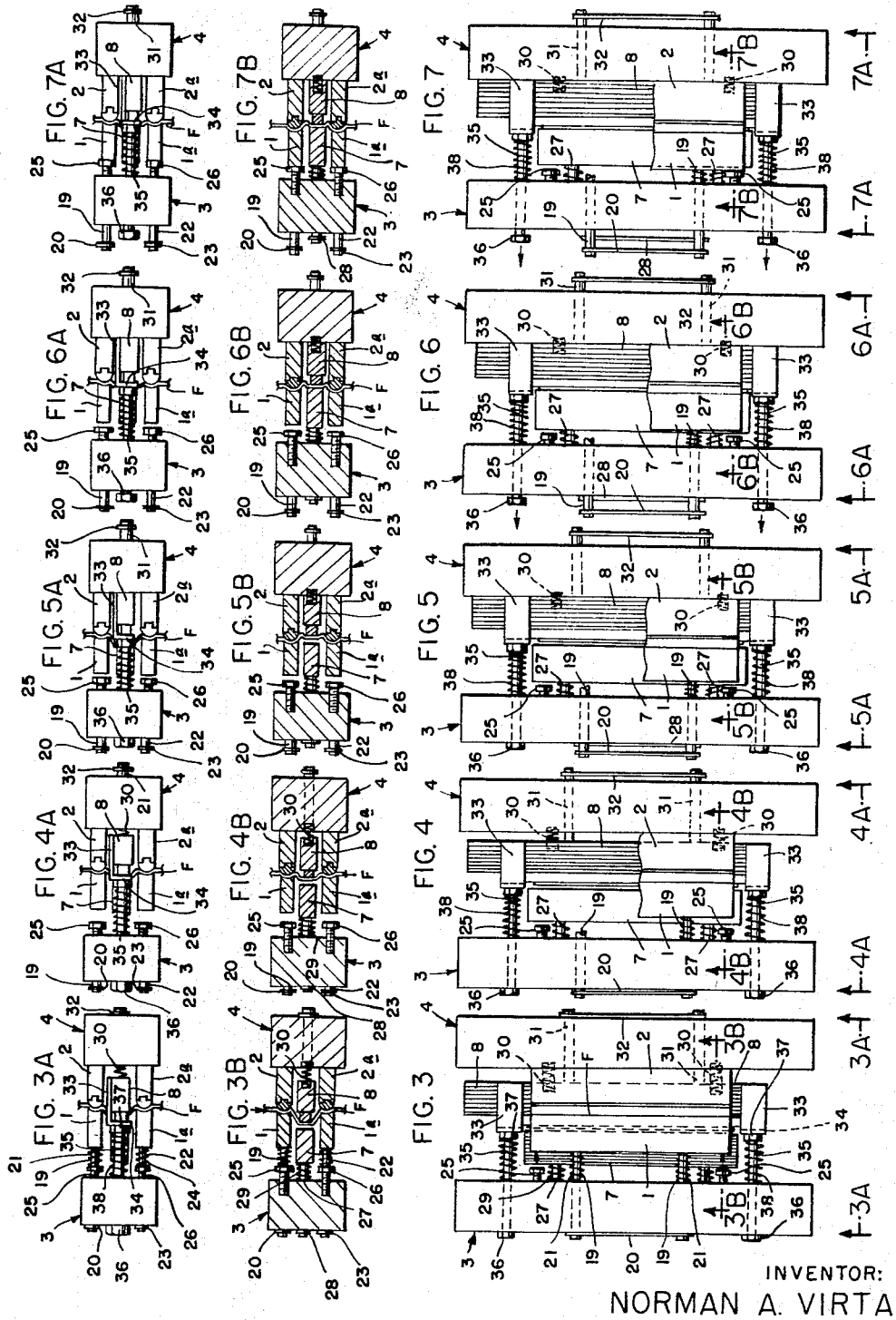

United States Patent Office 3,287,199
Patented Nov. 22, 1966

3,287,199
JAW ASSEMBLY FOR CONTAINER FORMING AND FILLING MACHINE
Norman A. Virta, Mount Prospect, Ill., assignor to Triangle Package Machinery Company, Chicago, Ill., a corporation of Illinois
Filed Oct. 24, 1963, Ser. No. 318,578
5 Claims. (Cl. 156—583)

This invention relates in general to packaging machines especially of the type wherein a heat sealable web of film is formed into a container, then filled and sealed. More particularly, the invention is directed to a novel jaw assembly utilized for the purpose of clamping and sealing the film and moving the formed container in a longitudinal direction for the filling and sealing of the next successive container.

As an example of such machines, reference is made to certain prior art patents such as Sonneborn et al., No. 2,200,971 and my earlier Patent No. 3,040,490. Jaws of the general type to which this invention relates may be found in the Newell et al. Patent No. 3,061,989.

In accordance with such machines, a web of material is pulled over a form to shape it into a tube. Heat and pressure are applied to form a seal transversely of a previously formed tube, overlapping portions of the material forming the tube being sealed longitudinally in the course of the downward movement of the material around the tubular mandrel around which the container has been formed.

As is customary in such packaging machines, a series of containers is successively formed and successively filled with a predetermined quantity of the product to be packaged. After the predetermined amount of packaged material has been deposited in the formed container which has been sealed at its bottom, pairs of clamping and sealing jaw members move toward each other and clamp the film therebetween above the material in the container. These jaw members have a dual function. One is to seal and cut the film thereby providing a severed container sealed at both ends, and the other is to pull the film or web downwardly a predetermined distance, whereupon the next successive formed container is filled with the predetermined amount of material.

As is also customary and well known in machines of this type, the sealer jaws are designed to operate in accordance with the thermal impulse sealing method described, for example, in Langer Patent No. 2,460,460. A high resistance heater ribbon is positioned across the face of one jaw and a Teflon coated cutting wire is stretched across a rubber covered opposing face of the opposite jaw. Thus, when the jaws are clamped together over the film an electrical impulse in the heater ribbon provides the sealing heat, and the concentration of conducted heat and pressure along the wire simultaneously severs the film, separating the filled container from the remainder of the film located thereabove.

One of the problems encountered in such packaging machines has been the presence of stresses in the film caused by the weight of the product in the container being held by the sealer jaws, or because of the pull on the film being drawn down over the forming mandrel. Heretofore the clamping and sealer jaws have not been designed to fully compensate for this stress in the film.

A pair of opposed sealer jaws has heretofore been used wherein opposed pairs of clamping jaws have been provided, one above and one below the sealer jaws. Thus, there will be a short length of film stretched between the upper and lower pairs of clamping jaws, and the film clamped between the sealer jaws is still under the stress of product weight or pull of the film over the forming mandrel even after the clamping jaws have reached their maximum clamping pressure. This stress tends to rupture the film the instant it is heated.

The present invention, therefore, is directed to a jaw assembly for packing machines of the type hereinabove referred to so constructed that the stress otherwise present in the film will be eliminated, thereby obviating any tendency for the film to rupture when it is heated.

With the foregoing considerations in mind, it is a principal object of the present invention to provide a jaw assembly for a packaging machine wherein the sealing of the heat sealable film, which has been formed into a container, is accomplished in an area of the film which is free of stress.

Another object of the invention is to provide a jaw assembly for a packaging machine of the character above referred to wherein slack is developed in the area of the film where the seal is to take place, thus eliminating stress in that area which normally would be present.

A further object of the invention is to provide a jaw assembly of the character and for the purpose above described in which opposed pairs of clamping jaws disposed in spaced-apart relation clamp the container film therebetween, and wherein slack in the film is developed between the spaced pairs of clamping jaws so that the sealer jaws located between the pairs of clamping jaws will seal the film while it is free of stress in its slack condition.

Still another object of the invention is to provide a jaw assembly wherein the clamping jaws which clamp the film therebetween and the sealer jaws which seal the clamped film are so controlled in the relative positions and movements thereof that the film is relieved of all, or substantially all, of the stress normally present therein in the area where the seal takes place.

A still further and more specific object of the invention is to provide a jaw assembly wherein upper and lower pairs of clamping jaws and a pair of sealer jaws between them move to clamp a length of container-forming film therebetween, and wherein one of the sealer jaws protrudes beyond the clamping faces of the clamping jaws on either side thereof, whereby the length of film between the upper and lower pairs of clamping jaws will be greater than the distance between said pairs of jaws, thereby resulting in a slack and stress-free condition in the film in the area where the sealing takes place when the protruding jaws move back to a position where they are substantially in line with the sealer jaw.

Other objects and advantages of the invention will become apparent upon reading the following description taken in conjunction with the accompanying drawings, in which:

FIG. 1 is a fragmentary plan view of the jaw assembly embodying the present invention;

FIG. 2 is an end elevational view of the structure shown in FIG. 1 and taken along the plane of line 2—2 thereof;

FIGS. 3 through 7 are diagrammatic plan views of the jaw assembly of the present invention illustrating progressively the relative positions of the respective clamping and sealer jaws as they move toward each other to the final completely closed and clamping position;

FIGS. 3A through 7A are end elevational views of FIGS. 3 through 7, respectively, taken along the plane of line 3A—3A through 7A—7A, and FIGS. 3B through 7B are transverse sectional views of FIGS. 3 through 7, respectively, taken along the plane of lines 3A—3A through 7A—7A, and As mentioned briefly hereinabove, the specific construction of the jaw assembly embodies a pair of upper clamping jaws and a pair of lower clamping jaws movable toward and away from each other so that when they are in the closed position, they clamp the container film therebetween. A pair of opposed sealer jaws are disposed between the upper and lower pairs of clamping jaws. The clamping jaws and sealer jaws are all mounted on jaw-supporting brackets so that as the brackets themselves move toward and away from each other, each of the clamping and sealer jaws of each pair will likewise move toward and away from each other.

The clamping jaws clamp the film therebetween, and the sealer jaws grip the film sufficiently so that a rise in temperature in the heater ribbon which is disposed on the face of one of the sealer jaws will heat-seal the film and the concentration of heat and pressure on the film along the cutting wire which is disposed on the opposing face of the opposite jaw will sever the film in that area. In this way the top of a filled container is sealed and at the same time the bottom of the next successive container is likewise sealed. The jaws then move downwardly to form the next container which is thereafter filled, and after filling, the jaws which have been returned to their uppermost position will again move toward each other for the sealing and cutting operation.

The construction of the jaws which causes slack in the film to be formed between the upper and lower pairs of clamping jaws and thus relieve the film of stress in that area is the subject matter to which the present invention is directed.

Referring now more particularly to the drawings, and especially to FIGS. 1 and 2, the upper rear clamping bar or jaw is indicated by the numeral 1, while the lower rear clamping bar or jaw is indicated at 1a. In opposition thereto there is a front upper clamping jaw 2 and a lower front clamping jaw 2a.

The rear clamping jaws 1 and 1a are suitably mounted, in a manner to be described hereinafter, on the jaw-supporting bracket generally indicated by the numeral 3. Likewise, the clamping jaws 2 and 2a are mounted on the front jaw-supporting bracket generally indicated by the numeral 4. It will thus be evident that when the brackets 3 and 4 are caused to move toward and away from each other, the clamping jaws 1 and 1a on the one hand, and jaws 2 and 2a on the other hand, will likewise be moved toward and away from each other.

The brackets 3 and 4 are mounted to slide along the horizontally positioned guide rods 5 and 6. The entire assembly is also mounted to reciprocate in a vertical direction by any suitable and well known means, which are not shown herein because they form no part of the present invention. Thus, when the jaw-supporting brackets 3 and 4 move toward each other to their clamping position, they will then move downwardly to draw the film over a suitable forming shoulder to form the next successive container.

The rear sealer jaw is indicated by the numeral 7 in FIG. 1 but cannot be seen in FIG. 2. Likewise, the front sealer jaw 8 is shown in both FIGS. 1 and 2. These sealer jaws are positioned opposite each other so that at the proper time they will grip the film and cause the sealing thereof. These various jaws and their relative movements will be understood more clearly hereinafter when reference is made more specifically to the figures on Sheet 2 of the drawings.

The jaw-supporting brackets are caused to reciprocate horizontally along the guide shaft 5 and 6 in a well known manner. In brief, it may be said that the rear bracket 3 is caused to reciprocate by reason of the drive links 9 and 10 suitably connected at one end thereof to the ends of the bracket 3. Likewise, drive links 11 and 12 suitably connected to the ends of the front bracket 4 cause a horizontally reciprocating movement of that bracket.

One end of each of links 9 and 10 is secured to the respective pins 13 and 14 extending outwardly from each end of the rear bracket 3, and thus forms the connection by which longitudinal movement of the drive links will effect a horizontal reciprocation of the jaw bracket 3.

The links 11 and 12 have at one end thereof the bearings 15 and 16, respectively, which receive the ends of the rods 17 and 18 which extend outwardly from opposite ends of the front support bracket 4. Thus, longitudinal movement of the links 11 and 12 will effect a horizontal reciprocation of the bracket 4. This movement of the links may be accomplished by any suitable and well known means (not shown).

The upper clamping jaw 1 is mounted on the bracket 3 by means of the studs 19. These studs are secured in spaced relation on the clamping jaw or bar 1 and extend through the bracket 3. A retainer plate 20 extends between the outermost ends of the studs 19 and thus holds them against movement in one direction with respect to the bracket through which they extend.

Coiled compression springs 21 surround the studs 19 and bear at one end against the forward surface of the rear bracket 3. The other end of each such spring will bear against the rear face of the upper clamping jaw 1, thereby normally to urge the clamping jaw 1 away from its mounting bracket 3 and toward the clamping jaw 2.

The lower clamping jaw 1a is similarly mounted on the bracket 3 by means of the studs 22 (FIG. 3A) which extend through suitable openings in the bracket 3 and have the retainer plate 23 extending therebetween. Coiled compression springs 24 surround the studs 22 and bear at one end against the bracket 3 and at their other ends against the face of the clamping jaws 1a. It is thus evident that the clamping jaws 1 and 1a are yieldably mounted with respect to the bracket 3 and both are normally urged away from the bracket toward the opposed clamping jaws 2 and 2a.

The upper and lower clamping jaws 2 and 2a are rigidly mounted on the inner face of the support bracket 4. As the brackets 3 and 4 move toward each other, the upper pair of clamping jaws 1 and 2 will clamp therebetween the film, indicated at F. Likewise, the lower clamping jaws 1a and 2a will clamp the film F therebetween along a line spaced downwardly from the upper clamping jaws 1 and 2. As the brackets 3 and 4 continue to move toward each other, the coiled springs 21 and 24 will be compressed and the upper and lower clamping jaws 1 and 1a will move toward the bracket 3, while the outer ends of the studs 19 and 22 will move outwardly from the bracket 3.

This is brought out more clearly in viewing FIGS. 3A to 7A and 3B to 7B, inclusive.

Stops in the form of bolts 25 for the upper clamping jaw 1, and 26 for the lower clamping jaw 1a, extend forwardly from the inner face of the bracket 3 to limit movement of these clamping jaws toward their supporting bracket. These may be seen in most of the figures and it will be noted particularly in FIGS. 7, 7A and 7B that the clamping jaws 1 and 1a have reached the stops 25 and 26 in the fully clamped position of the jaws.

It may be stated at this point that the studs 19 and 22, around which the springs 21 and 24 are located, are shown completely in FIGS. 3A and 3B, but those portions of the studs between the bracket 3 and the clamping jaws 1 and 1a have been omitted from FIGS. 4A through 7A and FIGS. 4B through 7B for purposes of clarity. These supporting studs 19 and 22 are in horizontal alignment with the stop members 25 and 26, and while all of them are shown in FIGS. 3 through 7, only the outer ends of the supporting studs are shown in FIGS. 4A through 7A and FIGS. 4B through 7B.

Thus far it will be evident that when the brackets 3 and 4 are moved toward each other to the initial clamping position of the clamping jaws, shown in FIGS. 3, 3A and 3B, the film F will be clamped between the upper and lower pairs of jaws. Continued movement of the brackets 3 and 4 toward each other will cause the upper and lower clamping jaws 1 and 1a to move toward the bracket 3 and will cause the supporting studs 19 and 22 to move outwardly relative to the bracket 3 against the compression of the springs 21 and 24. This movement continues until the clamping jaws 1 and 1a are brought against the stop members 25 and 26, whereupon the clamping of the film will reach its maximum pressure, as shown in FIGS. 7, 7A and 7B. The sealer jaw 7 is also yieldably mounted on the bracket 3 by means of the studs 27, each of which is secured at one end to the sealer jaw and extends through a suitable opening in the bracket 3. The outer ends of the studs 27 are connected by a retainer plate 28 extending therebetween and prevents movement of the studs 27 in one direction. Compression springs 29 surround the studs 27 and bear at one end against the sealer jaw and at the other end against the inner face of the bracket 3. Thus, sealer jaw 7 is free to move relative to its mounting bracket 3 but will not do so until it is forced by reason of contact with its opposed sealer jaw 8.

The opposed sealer jaw 8 is also yieldably mounted on the jaw bracket 4. A pair of spaced-apart compression springs 30 are seated in recesses in the jaw 8 and bracket 4. That is to say, suitable recesses or holes are drilled in one face of the bracket 4 to receive one end of a spring 30. Similar holes are drilled in the adjacent face of the sealer jaw 8 to receive the other ends of springs 30. These springs, therefore, hold the sealer jaw 8 in a position away from the bracket 4 but under suitable pressure will permit the jaw 8 to be moved toward the bracket 4 until the two members contact each other.

The sealer jaw 8 is mounted on the bracket 4 by means of the spaced studs 31 which extend through the bracket 4 and are secured at one end to the sealer jaw 8. The outer ends of the studs 31 are connected by means of a retainer plate 32, thereby limiting the movement of the sealer jaw 8 in a direction away from the bracket 4.

At each end of the sealer jaw 8 there is provided a bumper plate 33 which is preferably L-shaped so that the inner leg 34 thereof will extend in a substantially vertical direction. Opposite each of the bumper plates 33 there is positioned a stud 35 having an outer head 36 and an inner head 37. These studs 35 are spring-loaded by means of the coiled compression springs 38 which bear at one end against a face of the bracket 3 and at the other end against the head 37 of the stud 35.

When the brackets 3 and 4 are moved toward each other, the inner heads 37 of the mounting studs 35 will contact the respective legs 34 on the bumper plates 33 at approximately the same time that the upper pair of clamping jaws 1 and 2 and the lower pair of clamping jaws 1a and 2a initially clamp the film F therebetween.

As stated previously herein, the primary objective of the invention is to provide a slack length of the film F in the area where it is to be sealed and severed, thereby to avoid rupture of the film due to stresses therein which would otherwise be present. This is accomplished basically by apparatus which creates a length of film between the upper clamping jaws 1 and 2 and the lower clamping jaws 1a and 2a, which is greater than the actual straight line distance between the upper and lower pairs of clamping jaws. This resulting slack is maintained until the transverse seal takes place and the filled container is severed from the rest of the web.

For a clear understanding of the operation of the apparatus which accomplishes this novel result, reference will be made more specifically to FIGS. 3B through 7B and FIGS. 3A through 7A. The former series of figures illustrates successive relative positions of the upper and lower clamping jaws 1 and 1a, 2 and 2a, and sealer jaws 7 and 8, while the latter illustrates the manner in which this relationship of the various jaws is obtained.

Referring to FIG. 3B, it is to be noted that the sealing face of jaw 8 protrudes beyond the faces of the adjacent clamping jaws 2 and 2a. Also, it will be noted that the opposed clamping jaws 1 and 1a protrude beyond the face of the sealer jaw 7. The film F moves in a downward direction in FIG. 3B and in that figure it will be seen that the film is initially clamped between jaws 1 and 2, then extends in an offset relation around the face of the sealer jaw 8 and down between the lower clamping jaws 1a and 2a. Thus, the length of film between the upper and lower clamping jaws is greater than the distance between those jaws.

It will also be noted that the sealer jaws 7 and 8 at this point have not yet come into contact with each other.

Reference to FIGS. 3A and 3 illustrates the point that at approximately the same time the upper and lower clamping jaws clamp the film therebetween, the inner head 37 of the studs 35 will be in contact with the downturned end of the bumper plates 33. It should be emphasized at this point that the springs 38 are heavier than the springs 30 so that as the brackets 3 and 4 continue to move toward each other, pressure of the studs 35 against the bumper plates 33 will move the sealer jaw 8 toward the mounting bracket 4 or toward the right, as viewed in FIGS. 3A through 7A and FIGS. 3B through 7B.

At the same time, as the brackets 3 and 4 move toward each other, the upper and lower clamping jaws 2 and 2a will force the opposed clamping jaws 1 and 1a toward the bracket 3 or toward the left, as viewed in the aforementioned figures.

In FIG. 4B it will be noted that the sealer jaw 8 has moved toward the right a slight amount as the brackets 3 and 4 continue to move toward each other, and in FIG. 5B the sealer jaw 8 has contacted the bracket 4 and further movement thereof with respect to the bracket will stop. In this position of the parts, the faces of the upper and lower clamping jaws 2 and 2a and of the sealer jaw 8 will be in approximate alignment and the length of film between the pairs of clamping jaws will be in a slack condition.

In these same figures it will be noted that the upper and lower clamping jaws 1 and 1a have continued to move toward the bracket 3 against the force of springs 21 so that the clamping pressure between the pairs of clamping jaws will increase. Viewing all of the figures on Sheet 2, from left to right, the successive positions of the clamping jaws 1 and 1a are evidenced by the fact that the studs 19 and 22 on which these jaws are mounted, move away from the bracket 3 and outwardly toward the left therefrom.

After the various jaw members reach the position shown in FIGS. 5A and 5B where the sealer jaw 8 is bottomed against the bracket 4, the opposed sealer jaw 7 will then close the gap between the two jaws until they grip the film therebetween, as more clearly shown in FIG. 6B. At this moment a viewing of FIG. 6A indicates that the clamping jaws 1 and 1a have not quite reached the stop members 25 and 26. FIGS. 7A and 7B, however, show the clamping jaws 1 and 1a abutting against the stop members 25 and 26 so at this point the pressure between the clamping jaws will be at a maximum. At approximately this same moment heat is applied to the sealer jaws 7 and 8 which now have the film gripped therebetween to effect a seal transversely of the film, thus sealing the top of the filled container and forming a sealed bottom for the next successive container to be filled.

As mentioned hereinabove, the sealer jaw 8 is provided along its inner face and intermediate the longitudinal edges thereof with a wire or conductor, indicated in FIG. 2 by the numeral 39. A thermal impulse through the wire 39, at a temperature higher than that required for a seal, takes place which thereupon results in a severing or cutting of the film along the length of the wire.

It will thus be apparent that stress or pull in the film normally present, due to the weight of the material which fills the container or due to the pull exerted on the film when it is moved over the forming shoulder to the next successive position, will have been eliminated. The sealing and cutting of the film takes place in the slack portion thereof between the upper and lower pairs of clamping jaws so that the difficulties heretofore encountered by rupturing of the film when stress is present, is completely overcome.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. A jaw assembly for a packaging machine wherein a heat sealable web of film is formed into a container, then filled and sealed, said assembly comprising,
    (a) spaced pairs of clamping jaws
        (1) spaced longitudinally of said web of film and
        (2) adapted to clamp the film therebetween,
    (b) means to effect slack in that portion of the film between said spaced pairs of clamping jaws,
    (c) sealing means for sealing the film in said slack portion thereof between said spaced pairs of clamping jaws, said sealing means including,
        (1) a pair of sealer jaws movable toward each other into sealing position wherein the film is gripped therebetween, and
    (d) means for maintaining said sealer jaws separated until after said clamping jaws clamp the film therebetween and attain substantially the maximum clamping pressure thereof.

2. A jaw assembly for a packaging machine wherein a heat sealable web of film is formed into a container, then filled and sealed, said assembly comprising,
    (a) first and second opposed jaw supporting brackets movable toward and away from each other, and between which the film is adapted to move,
    (b) clamping jaws mounted on each of said brackets, the jaws on one bracket being in opposed relation to the jaws on the other bracket, and the jaws on each bracket being spaced apart in a direction longitudinally of the film, the opposed pairs of said jaws being adapted to clamp the film therebetween,
    (c) means to effect slack in that portion of the film between said pairs of spaced apart jaws,
    (d) first and second opposed sealer jaws yieldably mounted on said first and second brackets between said clamping jaws thereon, and movable with said brackets toward each other and into sealing position with the film gripped therebetween for sealing the film, and
    (e) means for maintaining said sealer jaws separated until after said clamping jaws clamp the film therebetween and attain substantially the maximum clamping pressure thereof.

3. A jaw assembly for a packaging machine wherein a heat sealable web of film is formed into a container, then filled and sealed, said assembly comprising,
    (a) upper and lower pairs of clamping jaws movable toward each other to clamp the film therebetween,
    (b) a pair of sealer jaws between said upper and lower pairs of clamping jaws also movable toward each other to grip the film therebetween for sealing the film,
        (1) one of said sealer jaws being positioned so that the gripping face thereof protrudes beyond the clamping faces of the clamping jaws between which said one sealer jaw is positioned, whereby
        (2) the length of film clamped between said upper and lower pairs of clamping jaws is greater than the distance between the clamping faces thereof,
    (c) means to move said one sealer jaw in a direction away from the film before the other sealer jaw reaches the film and while the film is clamped between said upper and lower pairs of clamping jaws, thereby to provide slack in the film, and
    (d) means to bring said sealer jaws together after the clamping jaws have clamped the film therebetween, thereby to grip the film therebetween and to heat seal the film in said slack length thereof.

4. A jaw assembly as defined in claim 2 wherein said last named means includes pusher studs on said first bracket adapted to contact said second sealer jaw as said products are moved toward each other.

5. A jaw assembly as defined in claim 4 including yieldable mounting means for said pusher studs which have a strength greater than the yieldable mounting means for said second sealer jaw, whereby said last named mounting means will yield until the movement of said second sealer jaw with respect to its bracket is stopped.

References Cited by the Examiner

UNITED STATES PATENTS 3,061,989  11/1962  Newell et al. _____ 53—182

EARL M. BERGERT, *Primary Examiner.*

DOUGLAS J. DRUMMOND, *Examiner.*